United States Patent
Nolte

(10) Patent No.: US 10,405,479 B2
(45) Date of Patent: Sep. 10, 2019

(54) MECHANICAL CYLINDER SYNCHRONIZER

(71) Applicant: Kinze Manufacturing, Inc., Williamsburg, IA (US)

(72) Inventor: Steve Nolte, North Liberty, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 186 days.

(21) Appl. No.: 15/471,091

(22) Filed: Mar. 28, 2017

(65) Prior Publication Data
US 2017/0273231 A1    Sep. 28, 2017

Related U.S. Application Data

(60) Provisional application No. 62/314,075, filed on Mar. 28, 2016.

(51) Int. Cl.
*A01B 63/22* (2006.01)
*A01C 7/20* (2006.01)

(52) U.S. Cl.
CPC .............. *A01B 63/22* (2013.01); *A01C 7/208* (2013.01)

(58) Field of Classification Search
CPC ................................ A01B 63/16; A01B 63/22
USPC ................................ 172/4, 4.5, 452; 404/85
See application file for complete search history.

(56) References Cited

U.S. PATENT DOCUMENTS

| | | | |
|---|---|---|---|
| 3,663,032 A * | 5/1972 | Hook | A01B 63/22 172/239 |
| 3,986,782 A * | 10/1976 | Durham | E01C 19/238 404/85 |
| 4,091,877 A * | 5/1978 | Berg | G05G 9/08 172/9 |
| 4,324,411 A * | 4/1982 | MacKenzie | A01B 63/22 137/99 |
| 4,379,491 A * | 4/1983 | Riewerts | A01B 63/22 172/328 |
| 4,381,036 A | 4/1983 | Fardal et al. | |
| 4,923,014 A * | 5/1990 | Mijnders | A01B 63/145 172/2 |
| 5,320,186 A | 6/1994 | Strosser et al. | |
| 5,449,042 A | 9/1995 | Landphair et al. | |
| 6,401,832 B1 * | 6/2002 | Payne | A01B 63/22 172/238 |

(Continued)

OTHER PUBLICATIONS

Kinze Manufacturing, Inc., "Notification of Transmittal of the International Search Report and the Written Opinion of the International Searching Authority, or the Declaration", dated Mar. 28, 2017.

*Primary Examiner* — Gary S Hartmann
(74) *Attorney, Agent, or Firm* — McKee, Voorhees & Sease, PLC

(57) ABSTRACT

One or more portions of an agricultural implement has components that are adjusted to adjust the height of the portions. This allows the implement to be used in a transport position or in a field use position. To better control the change in the height, an implement includes a mechanical control valve that mechanically controls an input to one or more actuators that are providing the height adjustment. The mechanical control valve is used to attempt to synchronize the actuation or more than one actuator so that the height of the implement is adjusted in a controlled manner. The mechanical control valve can be self-adjusting to maintain a synchronized change in height.

8 Claims, 8 Drawing Sheets

(56) References Cited

U.S. PATENT DOCUMENTS

| | | | |
|---|---|---|---|
| 6,578,642 B2* | 6/2003 | Cox | A01B 63/32 |
| | | | 172/166 |
| 7,063,167 B1* | 6/2006 | Staszak | A01B 63/22 |
| | | | 172/311 |
| 8,261,845 B2* | 9/2012 | Palen | A01B 63/22 |
| | | | 172/423 |
| 9,072,214 B2* | 7/2015 | Connors | A01B 63/006 |
| 9,386,742 B1* | 7/2016 | Barnett | A01B 63/22 |
| 2007/0023195 A1 | 2/2007 | Peck et al. | |
| 2013/0186657 A1 | 7/2013 | Kormann et al. | |
| 2017/0034989 A1* | 2/2017 | Westlind | A01B 63/22 |

* cited by examiner

MECHANICAL CYLINDER SYNCHRONIZER

CROSS-REFERENCE TO RELATED APPLICATIONS

This application claims priority under 35 U.S.C. § 119 to provisional application Ser. No. 62/314,075, filed Mar. 28, 2016, the contents of which are incorporated by reference in their entirety and for all purposes.

FIELD OF THE INVENTION

The present invention relates generally to agricultural implements. More particularly, but not exclusively, the invention relates to an agricultural planter wheel arm position that is load holding and does not require an electrical control system.

BACKGROUND OF THE INVENTION

Agricultural implements, and particularly, agricultural planting implements, include numerous hydraulic cylinders. These cylinders are generally controlled and monitored via an electronic control system. This can cause problems if the electronics fail or are damaged. There is currently no hydraulic system for implements that provide mechanical feedback for wheel arm position that is load holding and does not require an electrical control system.

SUMMARY OF THE INVENTION

It is a principal object, feature, and/or advantage of the present invention to overcome the deficiencies in the art.

It is an object, feature, and/or advantage of the invention to control a change in height of an agricultural implement via a mechanical control valve.

It is another object, feature, and/or advantage of the invention to attempt to substantially synchronize actuation of mechanisms for adjusting the height of an implement.

It is still another object, feature, and/or advantage of the invention to mechanically meter an input to one or more actuators used to adjust the height of a portion of an implement to control the raising and/or lowering of the implement.

These and/or other objects, features, and advantages of the present invention will be apparent to those skilled in the art. The present invention is not to be limited to or by these objects, features and advantages. No single embodiment need provide each and every object, feature, or advantage.

According to aspects of the invention, an agricultural implement is provided, and includes at least one member supported by a first wheel on a first side and a second wheel on a second side, the first and second wheels connected to the member via first and second wheel arms; and a system for actuating the first and second wheel arms to raise and lower the at least one member relative to the wheels; wherein the system comprises a mechanically-operated valve operatively connected to the first and second wheel arms for controlling the actuation of the system on the wheel arms to aid in raising and lowering the member to substantially raise and lower in sync.

According to additional aspects of the invention, a method of raising and lowering one or more portions of an agricultural implement includes the steps of actuating first and second actuators associated with first and second wheels of the implement, said actuators actuated by an input; mechanically metering said input based upon the height at a first location of the implement compared to a height of a second location of the implement; said mechanically metering of the input controlling the raising and lowering of the first and second locations to substantially raise and lower the same in sync with one another.

According to still further aspects of the invention, a method includes the step of mechanically metering the input for two or more actuators on an agricultural implement to substantially sync the movement of components of the implement based upon actuation of the two or more actuators.

Figure 1:
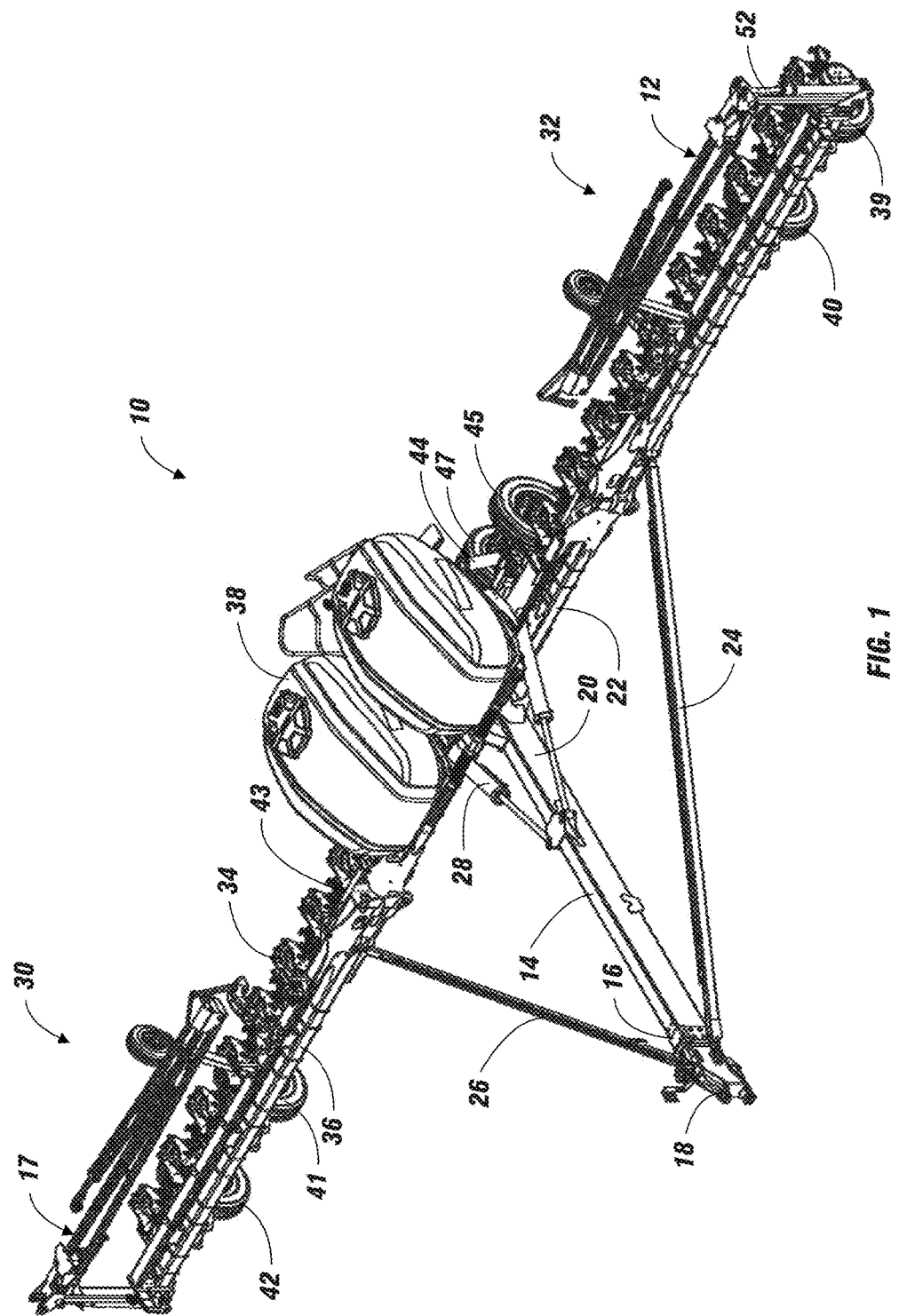
FIG. 1 is a perspective view of an agricultural planter implement.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 shows an agricultural implement 10, in this case, a planter for use with aspects of the invention. The implement 10 may be a planter, fertilizer, or the like, and is usually attached to and pulled by a tractor. However, it should be appreciated that other equipment and/or vehicles may move the implement 10. For purposes of the present disclosure, the implement 10 will be referred to as a planter. The planter 10 includes a tongue 14 having a first end 16 and an opposite second end 20. The tongue 14 includes a hitch 18, with the hitch 18 being connectable to a tractor (not shown). At the second end 20 of the tongue 14 is a central tool bar 22. The tongue 14 may be a telescoping tongue with components capable of being inserted into one another such that the planter 10 is a front folding style implement. However, the invention is not to be limited to such front folding style implements and is to include any such implement for use in the agricultural industry. For example, lift and rotate or rear folding planters are also contemplated to include some or all parts of the present disclosure.

As shown in FIG. 1, central hoppers 38 are positioned at the central toolbar 22. The hoppers 38 are configured to store seed, fertilizer, insecticide, or other types of material for use in farming. The use of the central hoppers 38 allows for a large amount of material to be added in a centralized location. However, the disclosure also contemplates the use of multiple hoppers positioned at each of the row units 34 of the planter 10. When central hoppers 38 are used at the central toolbar 22, it should be appreciated that the central hoppers will be in fluid communication with each of the row units 34. Also connected to the central toolbar 22 is a plurality of central wheels 45, 47, 49, and 51 extending generally downwardly from the central toolbar 22. The wheels contact the ground and support substantially all or most of the weight from the central hoppers 38. The wheels stabilize the implement 10 and contact the ground when in a working position or a transport position, e.g., if the implement 10 is a front folding implement such that the wings 30, 32 are folded forward with wing wheels 39, 168, 41, and 42 not contacting the ground.

Extending generally from both sides of the toolbar 22 are first and second wings 30 and 32. The wings 30 and 32 are generally identical and mirror images of one another. Therefore, only one wing will be described with the knowledge that the other wing will be generally the same configuration. The first wing 30 includes a bar 36. Mounted to the bar 36 are a plurality of row units 34, as well as a plurality of wheels 39, 40, 41, and 42. The wheels 39-42 are configured to contact the ground. The row units 34 may include seed meters, fertilizers, insecticide sprayers, or other dispensers, discs, or plows. The wings 30, 32 may also include at least one fold cylinder 28 and a weight distribution cylinder 43. The fold cylinder(s) 28 is configured to fold the wings to a position wherein the first and second wings 30, 32 are generally adjacent the tongue 14 of the implement 10. Therefore, the fold cylinders 28 must be sufficiently strong enough to be able to move the wings. Furthermore, draft links 24, 26 may extend between the tongue 14 and the wings 30, 32 to aid in supporting and folding of the wings. The weight distribution cylinder 43 can be utilized to translate the weight of the planter across the width of the planter to avoid and/or mitigate compaction in the field.

FIG. 1 also shows markers 17 and 12 connected to each of the wings 30 and 32, respectively. The markers 12, 17 create an identifiable border to aid in traversing the field. The markers may be selectively used such that a cylinder 48 is activated to raise and lower the marker 12 from the position shown to a position wherein the marker 12 is in contact or near contact with the ground.

Thus, as can be appreciated, there are numerous cylinders used with implements, such as a planter as shown and described. These cylinders are generally controlled and monitored via an electronic control system. This can cause problems if the electronics fail or are damaged. The invention provides for wheel arm position that is load holding and does not require an electrical control system.

FIGS. 2-7 are exemplary embodiments of a mechanical cylinder synchronizer, which may be utilized with an agricultural implemental 10 according to aspects of the disclosure. During the transport-to-field sequence or the field-to-transport sequence, ideally the right and left sides of the implement raise or lower in synchronous relationship to each other, hence they are in phase. Rephasing is necessary when the left or right side raises or lowers faster or slower in relation to each other.

Figure 2:
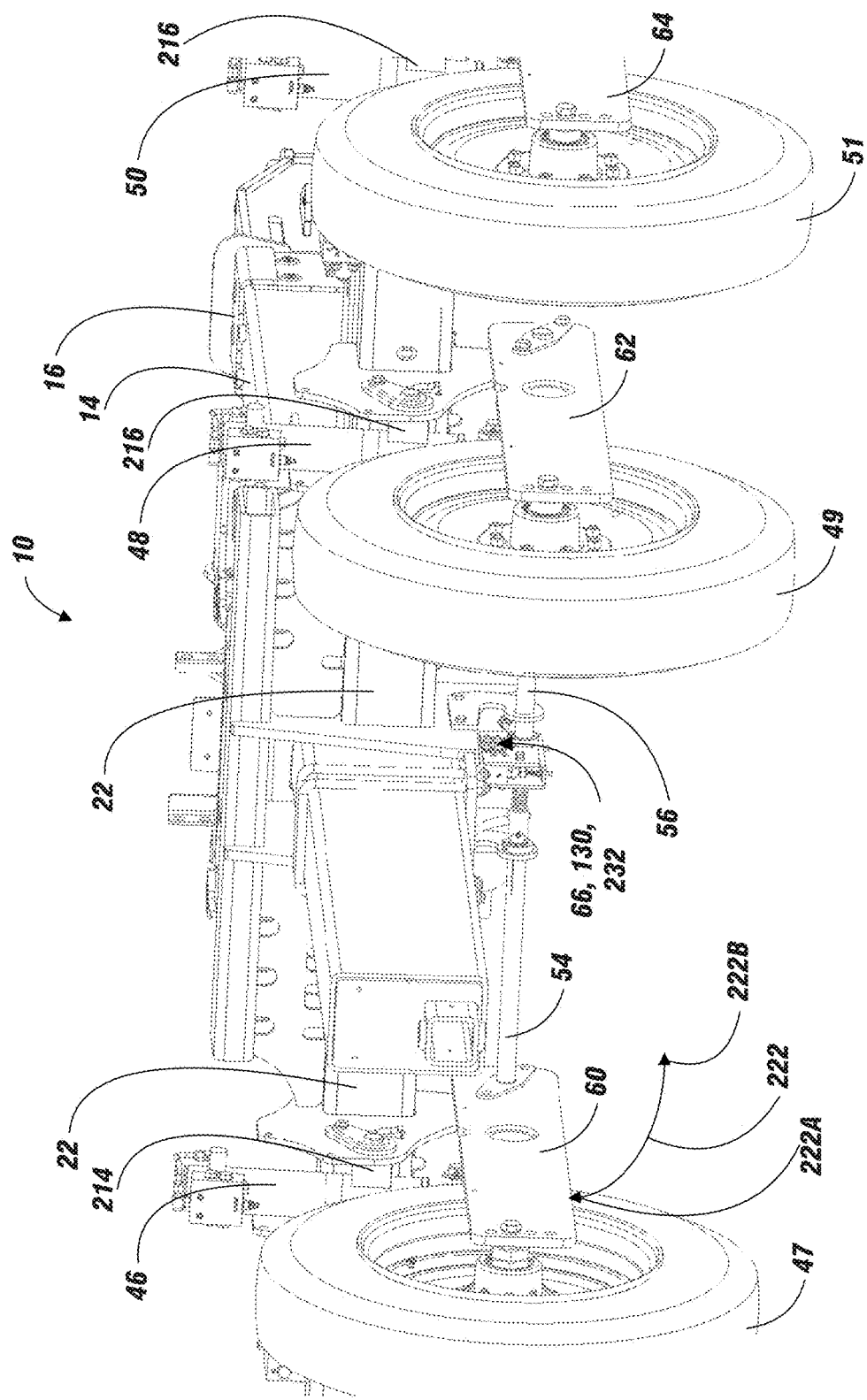
FIG. 2 is an isometric view of hydraulic components mounted to a typical row planter.

As shown in FIG. 2, the planter 10 is viewed from the rear and in a lowered state. Lowered refers to the height of the toolbar relative to the ground, wherein the lowered state generally means a working state in which the row units are interacting with a field. Connected to the central toolbar 22 are left side central wheels 45 and 47. On the right side of central toolbar 22 are center wheels 49 and 51. Center wheels 45, 47, 49, and 51 are supported by wheel arms 58, 60, 62, and 64. Wheel arms 58 and 60 are lifted and lowered via cylinders 44 and 46. In a preferred embodiment, the cylinders are hydraulic cylinders, but it should be appreciated that the cylinders could be hydraulic, electric, pneumatic, or some combination thereof. Likewise, wheel arms 62 and 64 are lifted and lowered via cylinders 48 and 50. Each lifting/lowering cylinder 44, 46, 48, and 50 attaches to the central toolbar 22 to weldments 214, 216, 218, and 220 via the cylinder barrel. Rotational arrow 222 represents wheel arms 58, 60, 62, and 64 path of travel. With the wheels lowered, they are at position 222A. With the toolbar lifted, the wheels are at position 222B.

Figure 3:
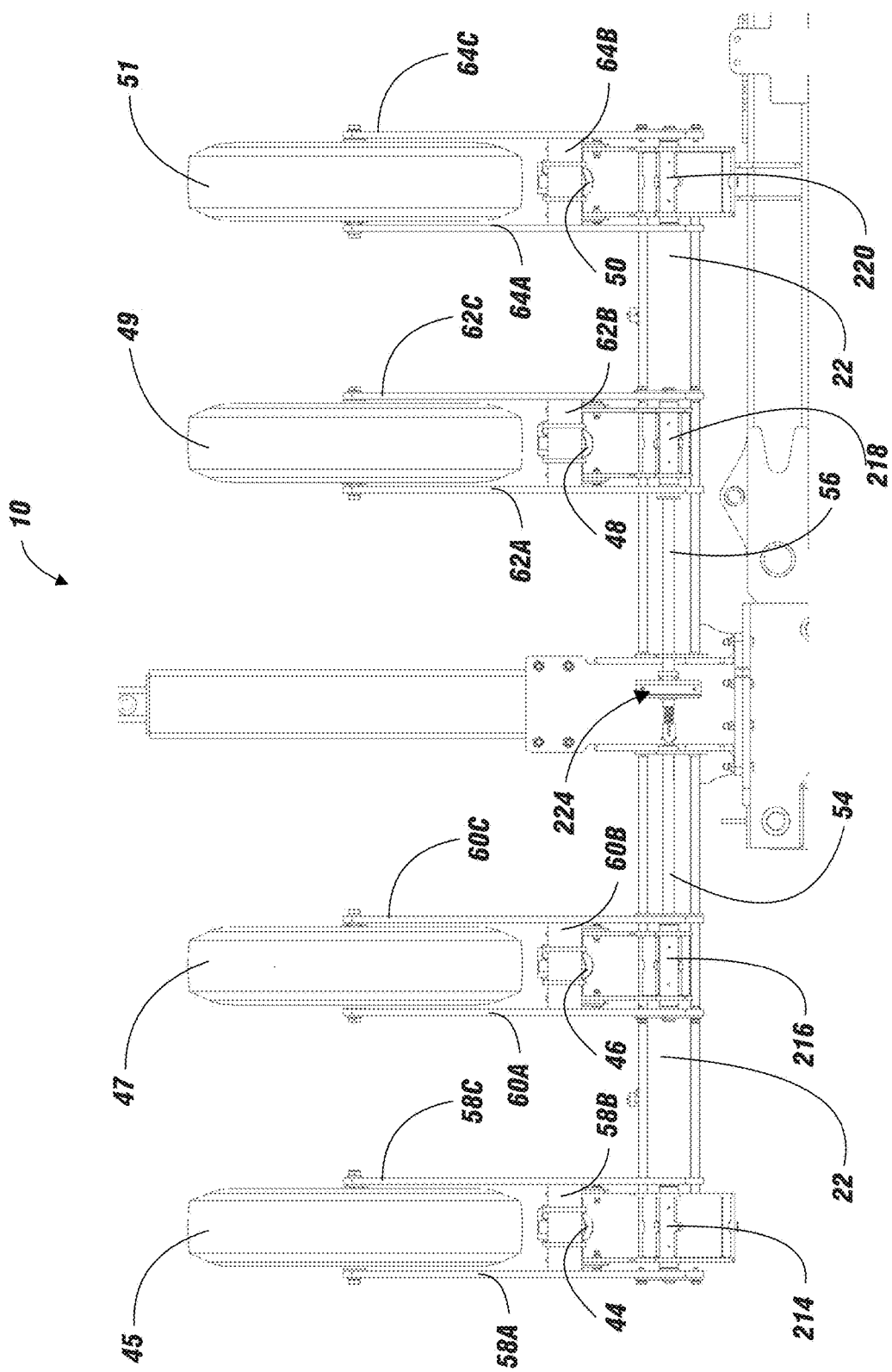
FIG. 3 is a rear view of hydraulic components mounted to a typical row planter.
Figure 4:
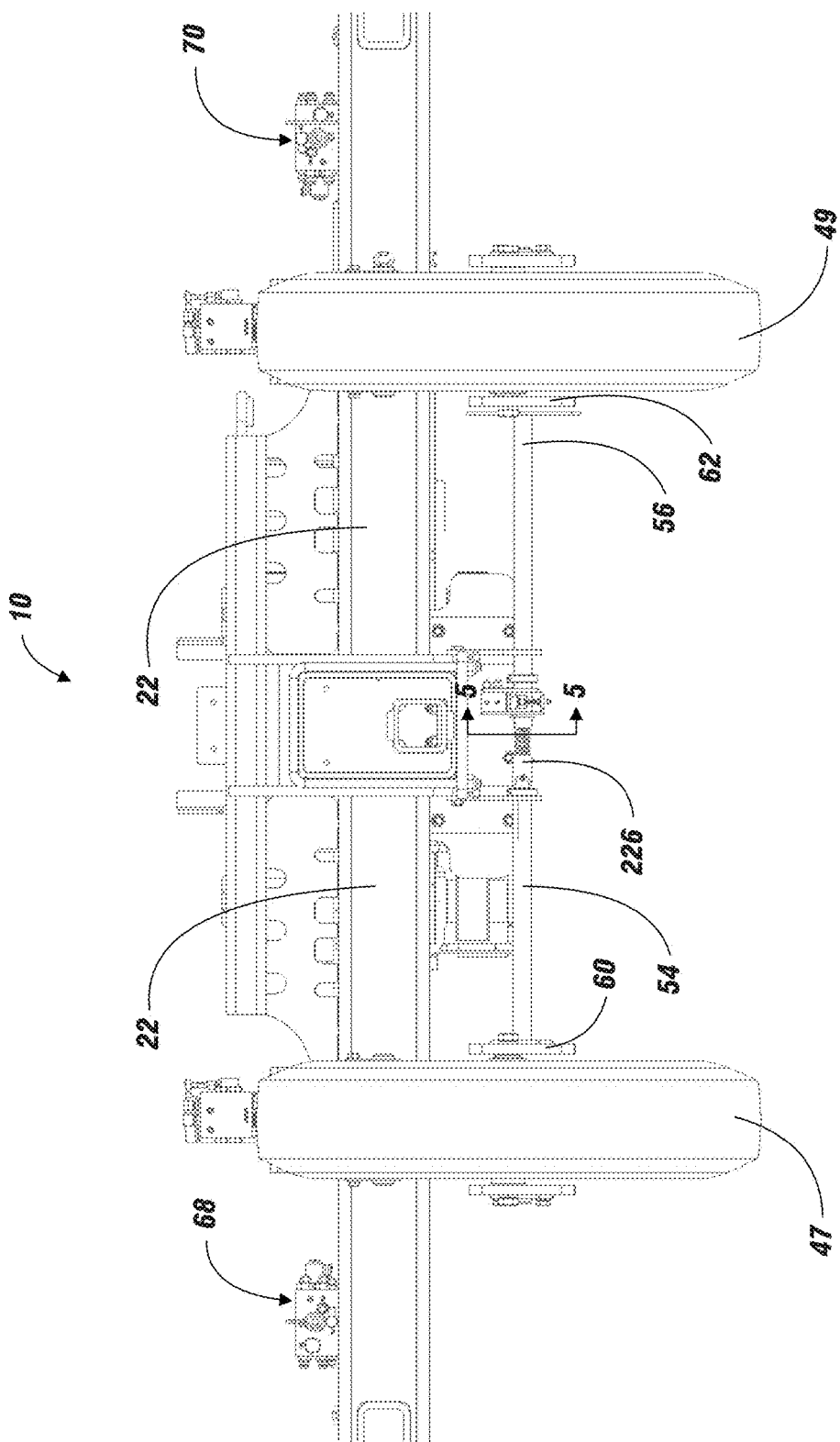
FIG. 4 is a top bottom of hydraulic components mounted to a typical row planter.

As shown in FIG. 3, the planter 10 is viewed from the bottom, wherein the left side is seen on the left and the right side is seen on the right. Wheel arms 58, 60, 62, and 64 are each weldments, which are comprised of components 58A-C, 60A-C, 62A-C, and 64A-C respectively. Each lifting/lowering cylinder 44, 46, 48, and 50 threaded male rod end (not shown) is attached to wheel arm plates 58B, 60B, 62B, and 64B respectively. Further, as shown in FIG. 4, the planter 10 is viewed from the rear and in a lowered state. Hydraulic components related to mechanical cylinder synchronization are located within manifolds 66, 68 and 70. Hydraulic circuit components which monitor each concentric shaft are located within logic manifold 66. Left side lifting/lowering cylinder hydraulic circuit components are located within manifold 68. Right side lifting/lowering cylinder hydraulic circuit components are located within manifold 70.

Figure 6:
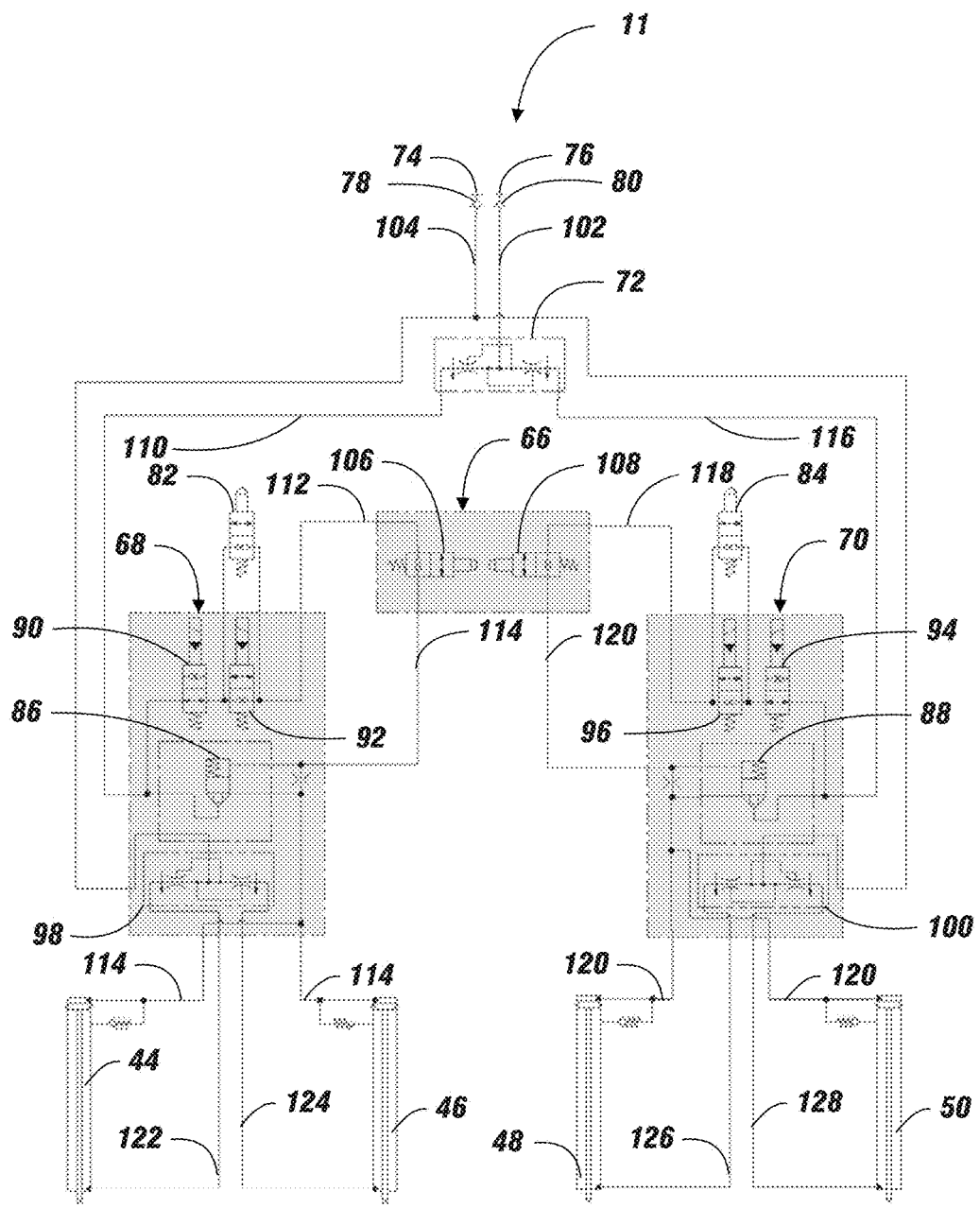
FIG. 6 is a schematic representation of circuit 1.

FIG. 6 shows aspects of an exemplary embodiment of an agricultural implement 10, in this case, a mechanical cylinder synchronizer hydraulic circuit 11. Coupler 74 connects to a prime mover (e.g., tractor, not shown) dedicated planter-lowering port on a selective valve control device (not shown). Likewise, coupler 76 connects to a prime mover (not shown) dedicated planter-lifting port on a selective valve control device (not shown). Couplers 74 and 76 each have a check valve 78 and 80, respectively, that are mechanically opened when inserted into a tractor. When a prime mover operator (not shown) actuates the lowering function to lower planter 10 from a transport height to a lowered height for field use, pressurized hydraulic fluid flows through hydraulic line 104 to flow divider/combiners 98 and 100. Flow divider/combiner 98 maintains a 50/50 flow to hydraulic lines 122 and 124. Hydraulic lines 122 and 124 allow hydraulic fluid to flow into the in-stroke port of cylinders 44 and 46. Simultaneously, flow divider/combiner 100 maintains a 50/50 flow to hydraulic lines 126 and 128. Hydraulic lines 126 and 128 pressurizes the in-stroke of cylinders 48 and 50.

Figure 5:
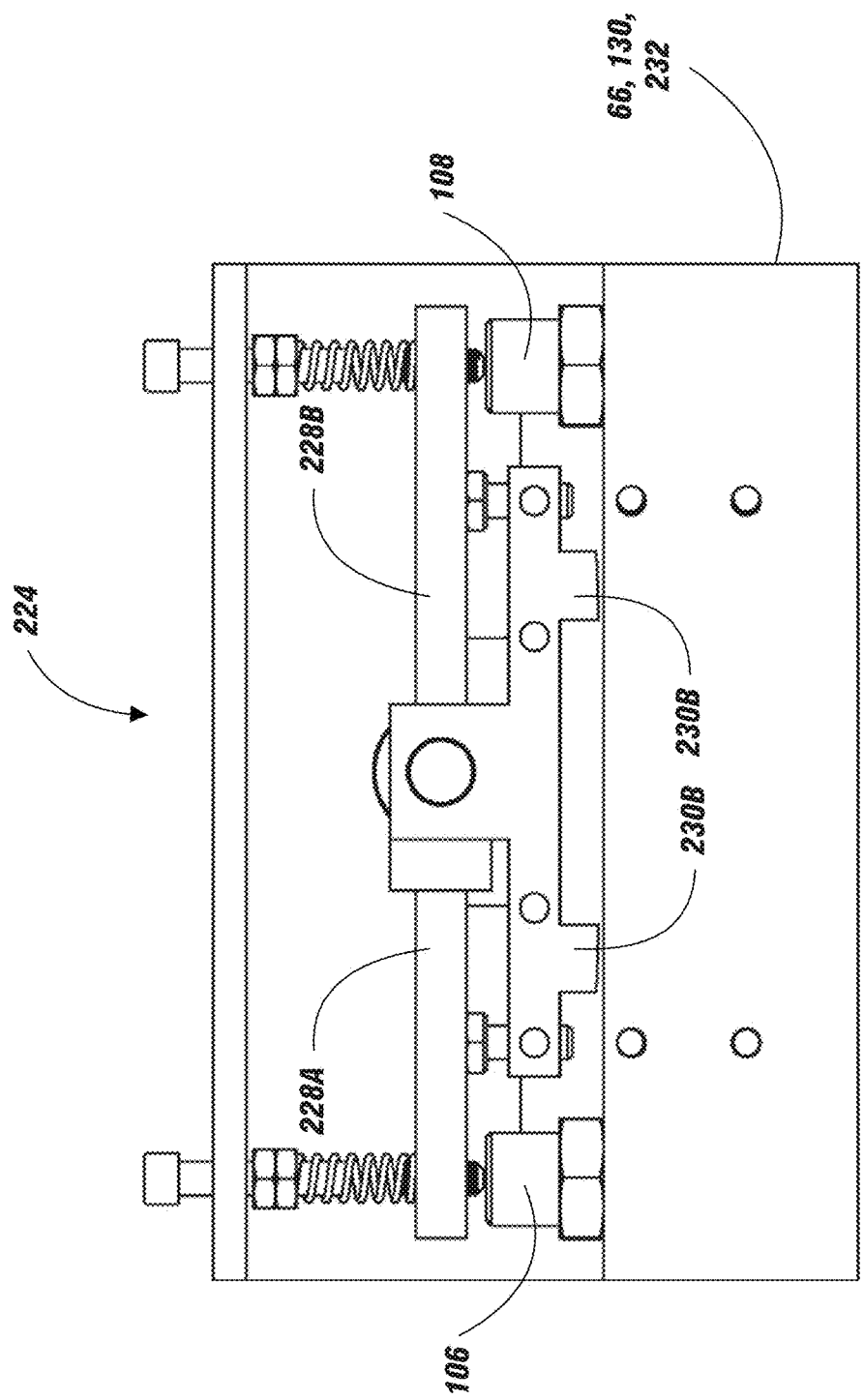
FIG. 5 is a side view of logic components mounted to a typical row planter.

Valve 82 is closed when wing 32 is locked out. Closing valve 82 also closes valve 86. Likewise, valve 84 is closed when wing 30 is locked out. Closing valve 84 also closes valve 88. Logic valves 106 and 108 located in manifold 66 and are in direct contact with plunger arm 228, as shown in FIG. 5. Manifold 66 is fixed to a plate, which is connected to one of the concentric shafts 54 on the wheel arm 60. The opposite plate is fixed to the rocker 230, which is connected to the other concentric shaft 56 from the opposing wheel arm 62. When the shafts become misaligned, the rocker 230 pushes up on the plunger arm 228, which closes the plunger valve 106 or 108 thus shutting the logic valve. Valve 86 can be controlled by both valves 82 and 106. Valve 88 can be controlled by both valves 84 and 108. Valves 106 and 108 can be closed at any time but not at the same time; this is dependent upon the respective rotation angle 222 of wheel arms 60 and 62 in the synchronizer manifold 66. Slip clutch 226 prevents any damage to the rotational assembly 224 if rocker arm 228 reaches its max movement.

Valves 90 and 92 are for accessory functions and are not needed for the synchronizer to operate, but are used for other fold functions (this is valid for circuit 11 and circuit 13). The operator operates a switch or button to send voltage to the valve to open it. Without this signal, the planter cannot be lowered in the transport position. Valve 92 overrides valve 82 in lowering functions when wings are locked for the left side. Valve 96 overrides valve 84 in lowering functions when wings are locked for the left side. Thus, utilizing circuit 11 when the planter is in a non-phased position (tipped), the low side is locked (caught) in place until the high side is retracted to within phase of the lower cylinder providing a rephasing function mid stroke during the lowering function). The catch function is completely mechanical such that it is independent of whether hydraulic or electrical power is applied or not, creating a safety catch during transportation, planting, or storage from possible leaks or drift.

Figure 7:
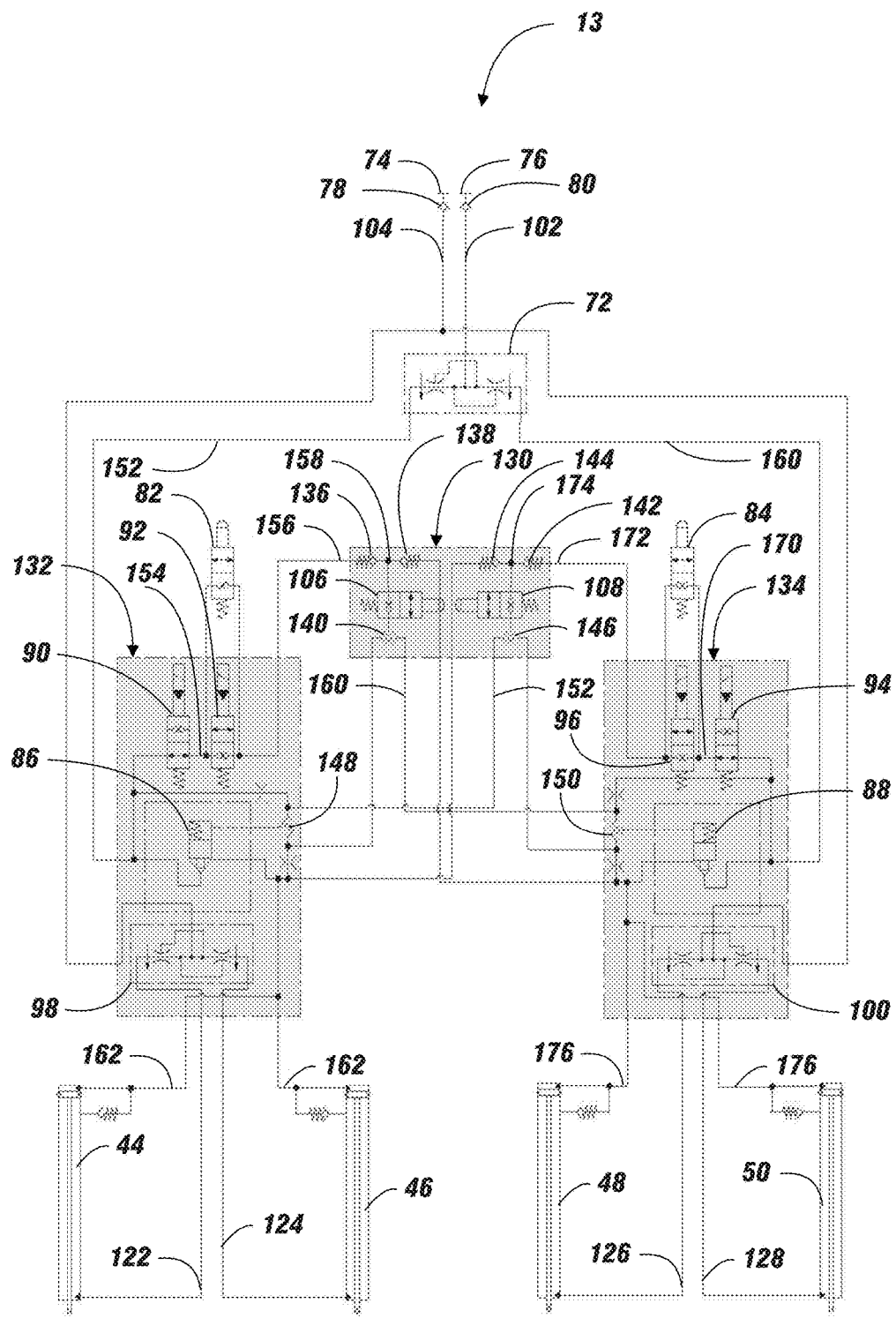
FIG. 7 is a schematic representation of circuit 2.

FIG. 7 shows aspects of another exemplary embodiment of an agricultural implement 10, in this case, mechanical cylinder synchronizer hydraulic circuit 13. Coupler 74 connects to a prime mover (not shown) dedicated planter-lowering port on a selective valve control device, not shown. Likewise, coupler 76 connects to a prime mover (not shown) dedicated planter-lifting port on a selective valve control device, not shown. Couplers 74 and 76 each have a check valve 78 and 80 respectively that are mechanically opened when inserted into a tractor (not shown). When a prime mover operator (not shown) actuates the lowering function to lower planter 10 from a transport height for field use, pressurized hydraulic fluid flows through hydraulic line 104 to flow divider/combiners 98 and 100. Flow divider/combiner 98 maintains a 50/50 pressure to hydraulic lines 122 and 124. Hydraulic lines 122 and 124 allow hydraulic fluid to flow into the in-stroke port of cylinders 44 and 46. Simultaneously, Flow divider/combiner 100 maintains a 50/50 pressure to hydraulic lines 126 and 128. Hydraulic lines 126 and 128 pressurizes the in-stroke of cylinders 48 and 50. Shuttle valves 140, 148 and check valve 136 allow pressure to drain to the return (line 152) thus permitting flow through valve 86. If valve 106 is closed, pressure builds on the control port of 86, thus blocking flow during the lowering function.

When a prime mover operator (not shown) actuates the lifting function to raise planter 10 from field use to transport height, pressurized hydraulic fluid flows through hydraulic line 152 to manifold 132 and through valves 90 and 82. Valve 82 is open when wing 32 is in the folded or transport position. Check valve 136 allows pressurized fluid to flow logic valve 106 to shuttle valve 140. Shuttle valves 140 and 150 provide pressure feedback to each cylinder 48 and 50 out-stroke port through hydraulic lines 160 and 162 and thus to maintain a constant psi drop across cylinders 44 and 46. Concurrently, pressurized hydraulic fluid flows through hydraulic line 160 to manifold 134 and through valves 94 and 84. Valve 84 is open when wing 32 is in the folded or transport position. Check valve 144 allows pressurized fluid to flow logic valve 108 to shuttle valve 144. Shuttle valves 144 and 148 provide pressure feedback to each cylinder 44 and 46 out-stroke port through hydraulic lines 152 and 162 and thus to maintain a constant psi drop across cylinders 44 and 46. Shuttle valves 146, 148 and check valve 144 allow pilot pressure to drain to out the stroke port of cylinders 44 and 46 if plunger valve 108 is open. If valve 108 is closed, pilot pressure builds on control port of valve 86, thus closing valve 86 and blocking flow during the lifting function.

Slip clutch 226 prevents any damage to the rotational assembly 224 if rocker arm 228 reaches its max movement. Valves 90 and 92 are for accessory functions and are not needed for the synchronizer to operate but are used for other fold functions. The operator has to operate a switch or button to send voltage to the valve to open it. Without this signal, the planter cannot be lowered in the transport position. Valve 92 overrides valve 82 in lowering functions when wings are locked for the left side. Valve 96 overrides valve 84 in lowering functions when wings are locked for the left side.

Thus, utilizing circuit 13 when the planter is in a non-phased position (tipped), the low side is locked (caught) in place until the high side is retracted to within phase of the lower cylinder providing a rephasing function mid stroke during the lowering function). The catch function is completely mechanical such that it is independent of whether hydraulic or electrical power is applied or not, creating a safety catch during transportation, planting, or storage from possible leaks or drift. In addition, circuit 13 can rephase itself mechanically during lift. Flow is blocked to the higher cylinder until the lower cylinder is in phase with the higher cylinder.

Figure 8:
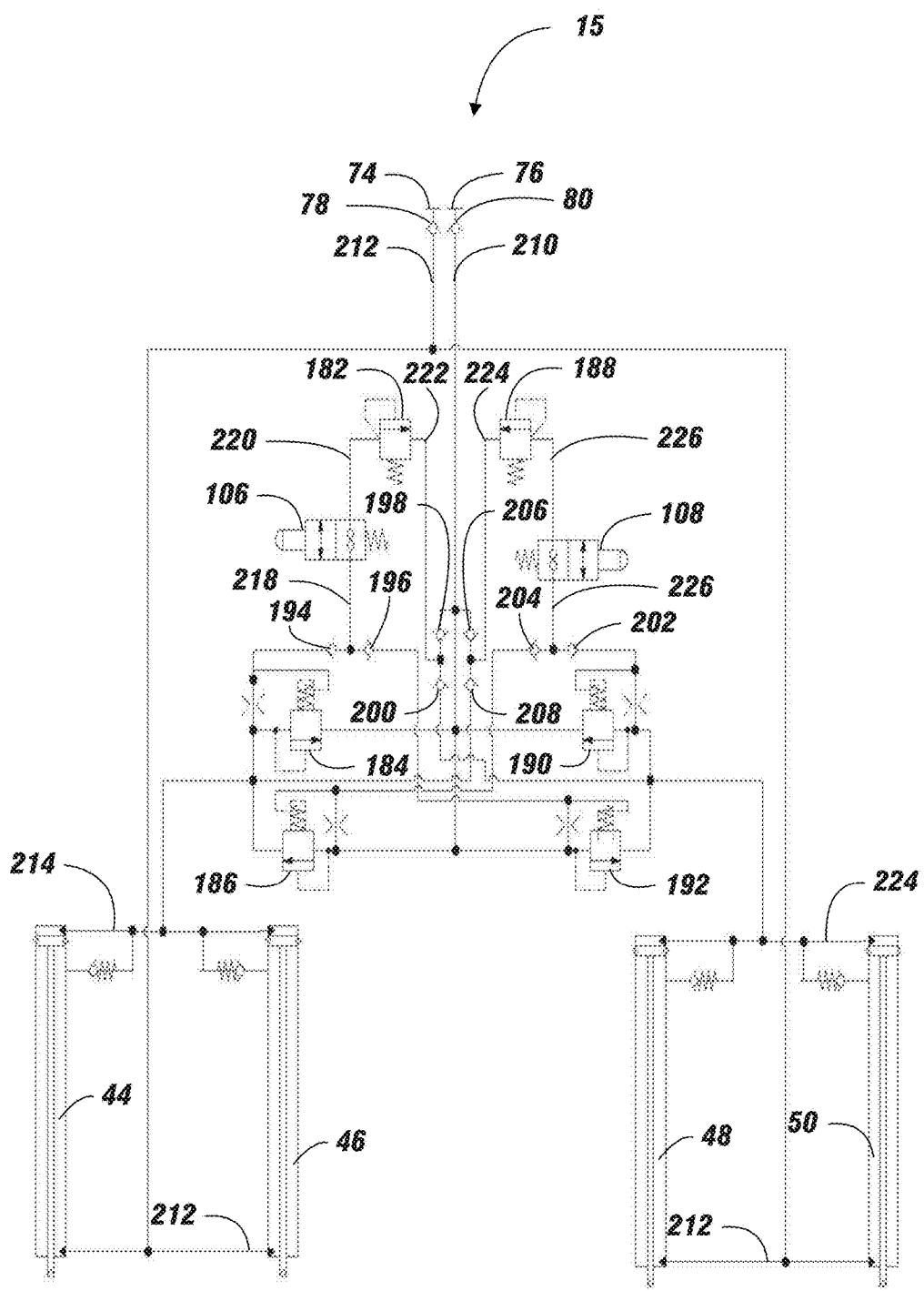
FIG. 8 is a schematic representation of circuit 3.

FIG. 8 shows yet another embodiment of an agricultural implement 10, in this case, a mechanical cylinder synchronizer hydraulic circuit 15. Plunger valves 106 and 108 are located in manifold 232 and are in direct contact with plunger arm 228. See, e.g., FIG. 5. Valves 182 and 188 are mechanically controlled pressure relief valves that are connected to concentric shafts 54 and 56. They function similar to valves 106 and 108 but instead of being open or closed, their pressure setting is increased, which in turn induces an extra load on their respective cylinders. Valves 106 and 108 still function as a "catch" during lift. When a prime mover operator (not shown) actuates the lifting function to raise planter 10 from field use height to a transport height, pressurized hydraulic fluid flows through hydraulic line 210.

Pressure from the line 210 forces open the valve 186. Pilot pressure flows through check valves 204, 108, 188 (which has a setting of 0 psi when cylinders are in phase), 206 or to the return. If the pressure setting of valve 188 is increased by an increase of the position angle error, the pressure required to open valve 186 increases, thus balancing the load between the left and right cylinders.

When a prime mover operator (not shown) actuates the lowering function to raise planter 10 from transport height to field use height, pressurized hydraulic fluid flows through hydraulic line 212.

Pressure from line 212 forces open valve 188. Pilot pressure flows through check valves 196, 106, 182 (which has a setting of 0 psi when cylinders are in phase), 198 or too the return. If the pressure setting of valve 182 is increased by an increase of the position angle error, the pressure required to open valve 192 increases thus balancing the load between the left and right cylinders.

Therefore, various systems, methods, and apparatus are provided to aid in controlling the lifting and/or lowering of an agricultural implement, or portions thereof. The circuits, controls, assemblies, etc., shown and described provide for a controlled lowering/lifting of the implement without requiring an electric control system. Instead, the disclosure provides for a mechanical feedback in the form of automatically shutting off the flow of hydraulics during the lifting or lowering process when one side becomes out of phase with the other. This allows the "lagging" side to catch up until the sides of the implement are or are close to one another in phase (i.e., lowering together).

Utilizing the mechanical feed provides numerous advantages. The system is less technical, and therefore, less complex than electrically-driven control systems that require complex algorithms and measurements to aid in providing substantially uniform lowering and/or lifting of the implement. The mechanical system is self-actuating in that the lag of one side will actuate the valve on the opposite side that is ahead, which will close off the valve, either entirely or partially, in order to allow the lagging side to continue to move to catch up until such point wherein the sides are in sync or substantially in sync. The closing and opening of the valves will direct and redirect the hydraulic fluid passing through the system, which is being used to lower and lift the implement via the cylinders. Thus, the system becomes less complex by not controlling the volumetric flow via solenoid or other electrically-driven mechanism, and instead by one mechanical plunger or other mechanism mechanically actuating the other to operate.

However, it should also be appreciated that any of the methods, systems, and/or apparatus shown and/or disclosed could include some electrically-operated components, which could act alone or in tandem with the mechanical components to aid in lifting and/or lowering the portions of the implement such that the lifting/lowering occurs in sync or at least partially in sync. The addition of the electrical components can provide a more controlled and/or precise measuring and/or redirecting of the hydraulic fluid, electric current, air, or other fluid that is being used to actuate the cylinders that are providing the lifting and/or lowering actions.

Therefore, the system, method, and means of lifting and/or lowering sections of a planter have been disclosed. The invention contemplates numerous variations, options, and alternatives, and it is not to be limited to the specific embodiments described herein. Those skilled in the art will appreciate that, while the invention has been heretofore disclosed, various other changes may also be included within the scope of the invention.

What is claimed is:

1. An agricultural implement, comprising:
   at least one member supported by a first wheel on a first side and a second wheel on a second side, the first and second wheels connected to the member via first and second wheel arms;
   a system for actuating the first and second wheel arms to raise and lower the at least one member relative to the wheels;
   wherein the system comprises a mechanically-operated valve operatively connected to the first and second wheel arms for controlling the actuation of the system on the wheel arms to aid in raising and lowering the member to substantially raise and lower in sync; and
   wherein the system comprises a rocker arm operatively connected to a plunger arm, wherein the rocker arm provides feedback as to the rates of raising or lowering of a side.

2. The agricultural implement of claim 1, wherein the at least one member comprises a toolbar.

3. The agricultural implement of claim 1, further comprising an actuator operatively connected to the first and second wheel arms adapted to move the wheel arms to raise and lower the at least one member.

4. The agricultural implement of claim 3, wherein the system further comprises a hydraulic fluid source, and wherein hydraulic fluid is used to actuate the actuators connected to the wheel arms.

5. The agricultural implement of claim 4, wherein the mechanically-operated valve controls the flow of the hydraulic fluid to the actuators during raising or lowering of the member.

6. The agricultural implement of claim 5, wherein the mechanically-operated valve is configured to allow flow during raising or lowering and to limit the flow when one of the first or second wheel arms is raised or lowered at a rate different than that of the other.

7. The agricultural implement of claim 1, wherein the plunger arm is in selective connection with a plunger valve, which provides actuation of an actuator to raise, lower, or halt movement of one of the wheel arms.

8. The agricultural implement of claim 7, wherein the plunger valve operatively connected to a logic valve to operate the actuation of the actuator.

* * * * *